No. 840,670. PATENTED JAN. 8, 1907.
L. THIEL.
VARIABLE SPEED MECHANISM.
APPLICATION FILED JULY 17, 1906.

2 SHEETS—SHEET 1.

Witnesses   Inventor
   Louis Thiel
   By
   Attorneys

UNITED STATES PATENT OFFICE.

LOUIS THIEL, OF CINCINNATI, OHIO, ASSIGNOR TO THE CINCINNATI MILLING MACHINE COMPANY, OF CINCINNATI, OHIO, A CORPORATION.

VARIABLE-SPEED MECHANISM.

No. 840,670.        Specification of Letters Patent.        Patented Jan. 8, 1907.

Application filed July 17, 1906. Serial No. 326,611.

*To all whom it may concern:*

Be it known that I, LOUIS THIEL, a citizen of the United States, residing at Cincinnati, in the county of Hamilton and State of Ohio, have invented certain new and useful Improvements in Variable-Speed Mechanism, of which the following is a specification.

My invention relates to variable-speed mechanism used in connection with machine-tools.

The principal object of my invention relates to the shifting of tumbler mechanism for accomplishing changes of speed from a driving to a driven shaft.

The features of the invention are more fully set forth in the description of the accompanying drawings, forming a part of this specification, in which—

Figures 1, 2:
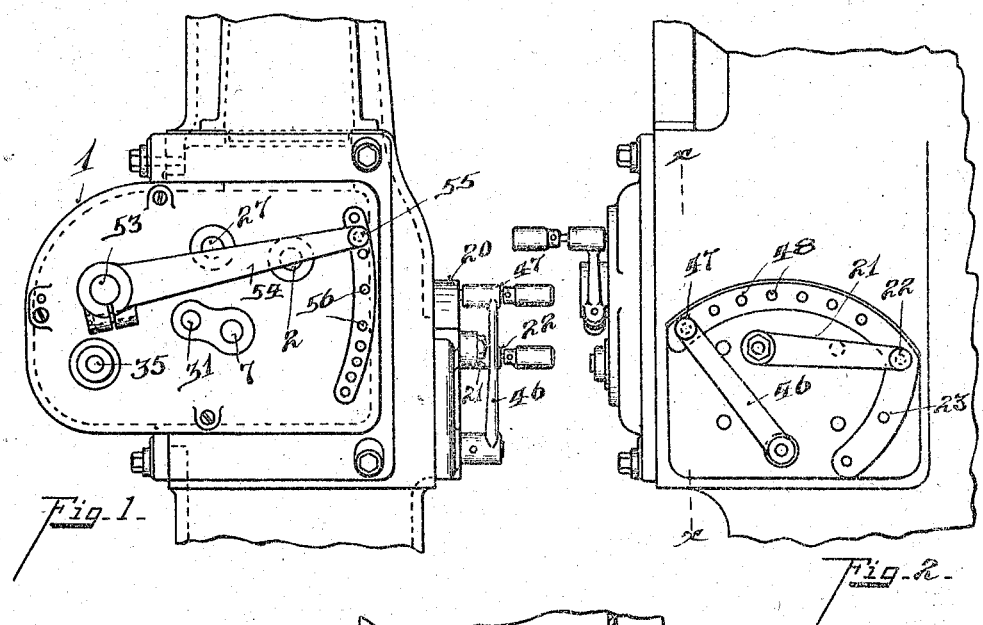
Figure 3:
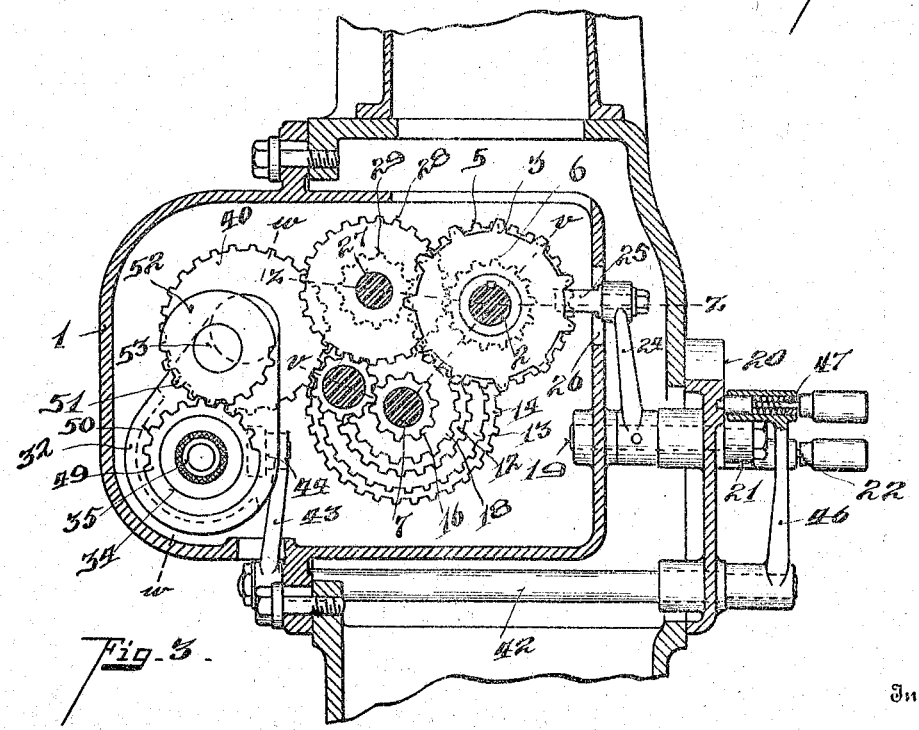
Figure 4:
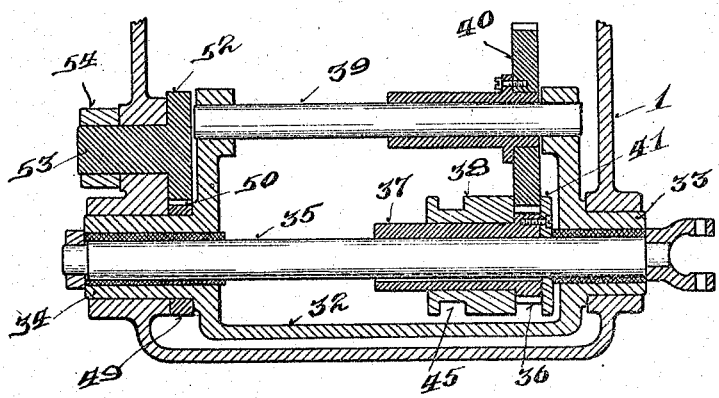
Figure 5:
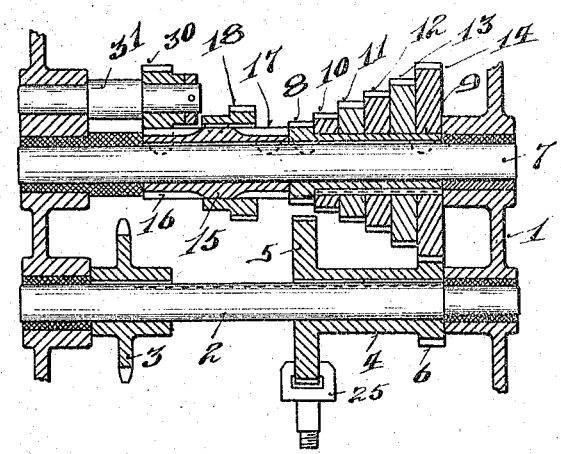
Figure 6:
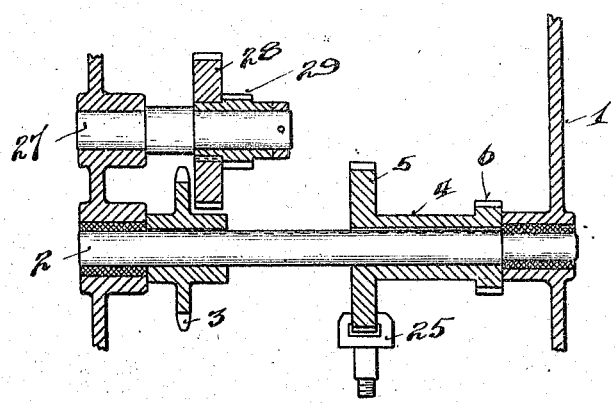

Figure 1 is a front elevation of my improved speed-box as applied to a milling-machine. Fig. 2 is a side elevation thereof. Fig. 3 is an enlarged section on line x x, Fig. 2. Fig. 4 is a section on line w w, Fig. 3. Fig. 5 is a section on line v v, Fig. 3. Fig. 6 is a section on line z z, Fig. 3.

Fig. 3 illustrates the general organization of the shafts and gearing.

1 represents a box inclosing the parts, to be hereinafter described.

2 represents the driving-shaft, suitably journaled in bearings in the box and having thereon a driving-wheel 3. (See also Fig. 5.) This wheel 3 is shown as a sprocket-wheel and is driven by a sprocket-chain (not shown) from the main drive of the machine. On shaft 2 is mounted a sleeve 4, adapted to turn with and slide on shaft 2; said sleeve being provided with two gears 5 6 of different diameter.

7 represents a second shaft journaled in the box, and which for convenience I will call a "cone-shaft." On shaft 7 is fixed a gear-wheel 8, having an elongated sleeve 9, upon which sleeve are fixed the successive gear-wheels of the cone 10, 11, 12, 13, 14, respectively.

15 represents a sleeve fixed to shaft 7, having the gear-teeth 16 and 17 cut on each end thereof, and 18 represents a gear-wheel fixed to the sleeve 15. The sleeve 4 may be slid so as to engage the gear-wheel 6 with the cone gear-wheel 14 for one rate of drive and also adapted to be slid to intermesh the gear-wheel 5 with the gear-wheel 18 for another change of speed to the cone. To slide sleeve 4, I journal a stud-shaft 19 in bearings formed in the casing or box 1 and in bearings formed in an index-plate 20, fixed to the body of the machine, within which the box or casing is secured. Shaft 19 is provided with a crank-handle 21, having detent mechanism 22 to engage the segmentally-arranged orifices 23 in the plate 20. On the inner end of shaft 19 an arm 24 is fixed, having a fork 25 swiveled in its free end. The box 1 is provided with an opening 26, through which the fork 25 projects, the inner end of the fork straddling the gear-wheel 5, so as to shift the sleeve 4, with its contained gears, to different positions. In order to utilize the shifting of sleeve 4 to give another change of speed to the cone of shaft 7, I provide a stud-shaft 27, upon which are fixed two gear-wheels of different diameter 28 29, respectively, adapted to rotate together. Gear-wheel 28 intermeshes with a pinion 30 on a stud-shaft 31 and pinion 30 intermeshing with the gear-wheel 16 on the cone-shaft 7. Therefore, if sleeve 4 be shifted still farther to the left, so as to disengage gear-wheel 5 from the gear-wheel 18, gear-wheel 5 can be intermeshed with gear-wheel 29 and a third change of speed imparted from shaft 2 to the cone-shaft 7. 32 represents a tumbler-frame provided with sleeve projections 33 34, at each end projecting through and journaling in the box.

35 represents a driven shaft journaled within the sleeve projections 33 34 of the tumbler-frame 32, thus forming a center for the tumbler-frame.

36 represents a pinion slidably mounted upon shaft 35, adapted to rotate the same, said pinion being provided with a sleeve 37, upon which a shifting sleeve 38 is fixed.

39 represents a swinging shaft fixed to the limbs of the tumbler-frame, upon which is loosely mounted the gear-wheel 40, intermeshing with the pinion 36.

41 represents a plate fixed to the pinion 36, forming means whereby when the pinion 36 is shifted to the right or left it will carry with it the gear-wheel 40.

The mechanism for sliding the tumbler-gears 36 40 consists of the following instrumentalities: 42 represents a rock-shaft journaled in the bottom of the box and indexing plate, having an arm 43 fixed to one end thereof, said arm 43 being provided with a plate 44, (see dotted lines, Fig. 3,) swiveled in the free end of arm 43 and engaging into the groove 45 of the sleeve 38. Upon the opposite end of shaft 42 a crank-handle 46 is provided, having detent mechanism 47, engaging with the segmentally-arranged orifices 48 of the index-plate 20. The orifices 48 represent the different lateral positions of adjustment of the tumbler-gears relative to the steps of the cone.

The mechanism for rocking the tumbler mechanism for intermeshing gear-wheel 40 with any one of the gears of the cone consists of the following instrumentalities, (see Figs. 3 and 4:) 49 represents a collar fixed upon the sleeve 34 of the tumbler-frame 33, said collar being provided with teeth 50, adapted to engage into the teeth 51 of the flange 52, formed on the stud-shaft 53, said stud-shaft 53 being journaled within suitable bearings of the box 1 and projecting through the same. 54 represents a lever fixed to said stud-shaft 53, the free end of said lever being provided with detent mechanism 55, adapted to engage with the segmentally-arranged orifices 56 on the end portion of the box 1, the position of these orifices 56 representing different vertical steps into which the tumbler-gear 40 can be brought for engaging the same with one of the cone of gears. Thus it will be seen that by manipulation of lever 54 the stud-shaft 53 and toothed flange 52 are rocked, correspondingly rocking the tumbler-frame 33, carrying with it the tumbler-shaft 39 with its gear 40.

From the foregoing description it will be understood that by manipulating the lever 21 three different rates of drive may be imparted to the cone-shaft 7. By manipulating the lever 46 the tumbler-gears can be adjusted laterally upon the driven shaft 35 and tumbler-shaft 39, respectively, to bring the tumbler-gear 40 opposite any selected gear of the cone, and by manipulating the lever 54 the tumbler mechanism and segmental rocking mechanism may be adjusted to bring the tumbling-gear wheel 40 into engagement with the selected gear-wheel of the cone. It will be seen that by this construction the tumbler-gear is positively supported through the use of an elongated tumbler-frame, thereby forming a very durable and powerful construction.

Having described my invention, I claim—

1. In a variable-speed device, a box, a cone-shaft, a series of different-diameter gear-wheels thereon, a second shaft, a rocking frame journaled in the box, a swinging shaft on the end of the frame, intermeshing gear-wheels on said second and swinging shafts adapted to be slid along said shafts and to be rocked by the frame to selectively engage the cone of gear-wheels, a rock-shaft, and mechanism coöperating therewith for sliding said intermeshing gear-wheels in unison, said rocking frame having a hub formed with gear-teeth, a stud-shaft journaled in the casing having a member within the casing formed with gear-teeth intermeshing with the hub-teeth, and a lever on the outer end of said stud-shaft for rocking said frame, substantially as described.

2. In a variable-speed device, a box, a cone and tumbler-gear system suitably mounted therein, the said tumbler comprising a frame journaled in the box, a central shaft and a swinging shaft journaled in the frame, there being intermeshing gear-wheels on said shafts adapted to be slid along to impart a drive from the cone-shaft to the central shaft, a rock-shaft, and mechanism coöperating therewith for sliding said intermeshing gear-wheels in unison, said rocking frame having a hub formed with gear-teeth, a stud-shaft journaled in the casing having a member within the casing formed with gear-teeth intermeshing with the said hub-teeth, and a lever on the outer end of said stud-shaft whereby said shaft may be rocked, substantially as described.

3. In a variable-speed device, a box, a cone-shaft, different diameter gear-wheels thereon, a tumbler-frame having end hubs journaled in the casing, a central shaft journaled in the said hubs of the frame, whereby said frame rocks thereon, a swinging shaft supported by the end of the frame, intermeshing gear-wheels on the said central shaft and swinging shaft adapted to slide thereon in unison, a rock-shaft projecting through the casing and having connections for adjustably sliding said intermeshing gear-wheels on said shafts, one of the hubs of the frame being formed with gear-teeth, a stud-shaft journaled in the casing having on the inside a member formed with gear-teeth meshing with the teeth of said hub, and a lever fixed to the outer end of said stud-shaft for adjustably rocking the said frame, substantially as described.

In testimony whereof I have hereunto set my hand.

LOUIS THIEL.

Witnesses:
OLIVER B. KAISER,
LEO O'DONNELL.